US 9,110,508 B2

(12) United States Patent
Koga et al.

(10) Patent No.: US 9,110,508 B2
(45) Date of Patent: Aug. 18, 2015

(54) ELECTRONIC DEVICE HAVING A VIBRATING SECTION FOR MULTIPLE TOUCHES

(71) Applicant: Panasonic Corporation, Osaka (JP)

(72) Inventors: Akira Koga, Osaka (JP); Keiki Yoshitsugu, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 145 days.

(21) Appl. No.: 13/745,992

(22) Filed: Jan. 21, 2013

(65) Prior Publication Data

US 2013/0187881 A1 Jul. 25, 2013

(30) Foreign Application Priority Data

Jan. 24, 2012 (JP) ................................. 2012-011888
Dec. 10, 2012 (JP) ................................. 2012-268924

(51) Int. Cl.
*G06F 3/041* (2006.01)
*G06F 3/01* (2006.01)
(52) U.S. Cl.
CPC .......... *G06F 3/016* (2013.01); *G06F 2203/014* (2013.01)
(58) Field of Classification Search
CPC ........................... G06F 2203/014; G06F 3/016
USPC ........................................................ 345/173
See application file for complete search history.

(56) References Cited

U.S. PATENT DOCUMENTS

| 5,844,547 | A | 12/1998 | Minakuchi et al. |
| 2005/0162402 | A1* | 7/2005 | Watanachote ................ 345/173 |
| 2005/0174336 | A1 | 8/2005 | Nakayama et al. |
| 2010/0156818 | A1* | 6/2010 | Burrough et al. ............. 345/173 |
| 2010/0182135 | A1* | 7/2010 | Moosavi ..................... 340/407.2 |
| 2011/0260996 | A1* | 10/2011 | Henricson ..................... 345/173 |
| 2012/0218200 | A1* | 8/2012 | Glazer et al. ................. 345/173 |

FOREIGN PATENT DOCUMENTS

| JP | 2002-304256 A | 10/2002 |
| JP | 2005-222326 A | 8/2005 |
| JP | 2010-055282 A | 3/2010 |

* cited by examiner

*Primary Examiner* — Long D Pham
(74) *Attorney, Agent, or Firm* — Renner, Otto, Boisselle & Sklar, LLP (57) ABSTRACT

An electronic device presents, to the user, a realistic control feel in response to a complicated operation such as an operation using multiple fingers. An electronic device 10 includes a touch panel 11 to be touched by the user, a vibrating section 13 for vibrating the touch panel 11, and a vibration control section 33 for controlling the vibration of the vibrating section 13. The vibration control section 33 changes the vibration of the vibrating section 13 when, after the user touches the touch panel 11 with multiple fingers, the user lifts at least one of the multiple fingers off the touch panel 11 with at least one other of the multiple fingers remaining on the touch panel 11.

7 Claims, 12 Drawing Sheets

ELECTRONIC DEVICE HAVING A VIBRATING SECTION FOR MULTIPLE TOUCHES

BACKGROUND

1. Technical Field

The present disclosure relates to an electronic device which generates vibrations, etc., in response to a touch operation by a user.

2. Description of the Related Art

For electronic devices with touch panels provided on display screens, there are techniques known in the art for giving a tactile sensation to the user by vibrating the touch panel for the purpose of improving the controllability for the user. A voltage is applied to a piezoelectric element fixed to the touch panel so as to generate vibrations to the touch panel, thereby giving a tactile sensation to the user (see, for example, Japanese Laid-Open Patent Publication No. 2005-222326). Then, whether an electronic device has accepted an input which has been made through a touch panel operation can be perceived by the user not only visually but also through a tactile sensation, thereby enhancing the recognition of the input status and enabling stable input operations.

SUMMARY

The present disclosure provides an electronic device which realizes a realistic control feel when the user operates the touch panel with multiple fingers.

An electronic device according to one embodiment of the present disclosure includes: a touch panel to be touched by a user; a vibrating section for vibrating the touch panel; and a vibration control section for controlling the vibration of the vibrating section. The vibration control section changes the vibration of the vibrating section when, after the user touches the touch panel with multiple fingers, the user lifts at least one of the multiple fingers off the touch panel with at least one other of the multiple fingers remaining on the touch panel.

With an electronic device according to one embodiment of the present disclosure, the vibration of the touch panel is changed when, after the user touches the touch panel with multiple fingers, the user lifts at least one of the multiple fingers off the touch panel with at least one other of the multiple fingers remaining on the touch panel. Thus, it is possible to present, to the user, a realistic control feel in response to an operation when operating the touch panel with multiple fingers.

DETAILED DESCRIPTION

Embodiments will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

(Embodiment 1)

With conventional electronic devices capable of vibrating touch panels, a vibration is generated in response to a simple operation, e.g., generating a vibration when the user touches an icon or a keyboard displayed on the display screen. Thus, it has not been possible to present, to the user, a realistic control feel in response to a complicated operation, such as the user operating the touch panel with multiple fingers.

An electronic device according to one embodiment of the present disclosure presents, to the user, a realistic control feel in response to a complicated operation such as an operation using multiple fingers. The embodiment will now be described with reference to the drawings.

<General Configuration of Electronic Device>

Referring to FIGS. 1, 2, 3, 4 and 5, a general configuration of an electronic device 10 according to one embodiment will be described.

Figure 1:
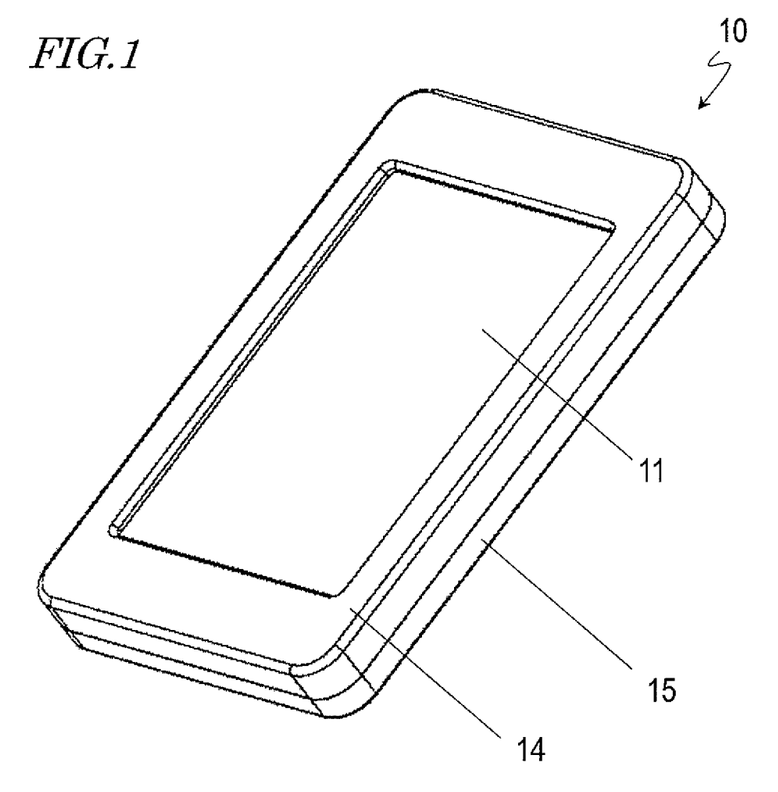
FIG. 1 is an external perspective view showing an electronic device according to one embodiment.
Figure 2:
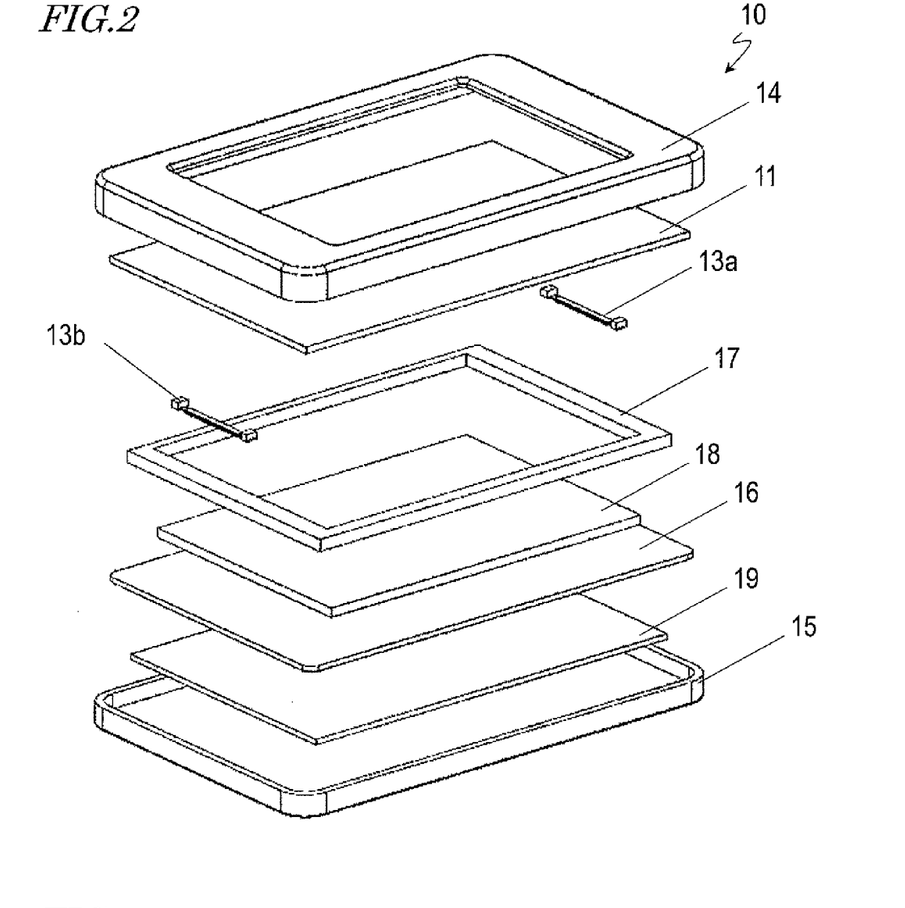
FIG. 2 is an exploded parts view showing an electronic device according to one embodiment.
Figure 3:
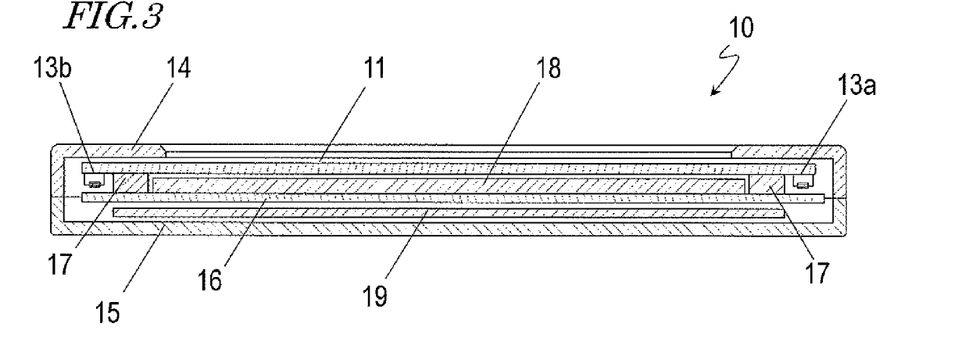
FIG. 3 is a cross-sectional view showing an electronic device according to one embodiment.
Figure 4:
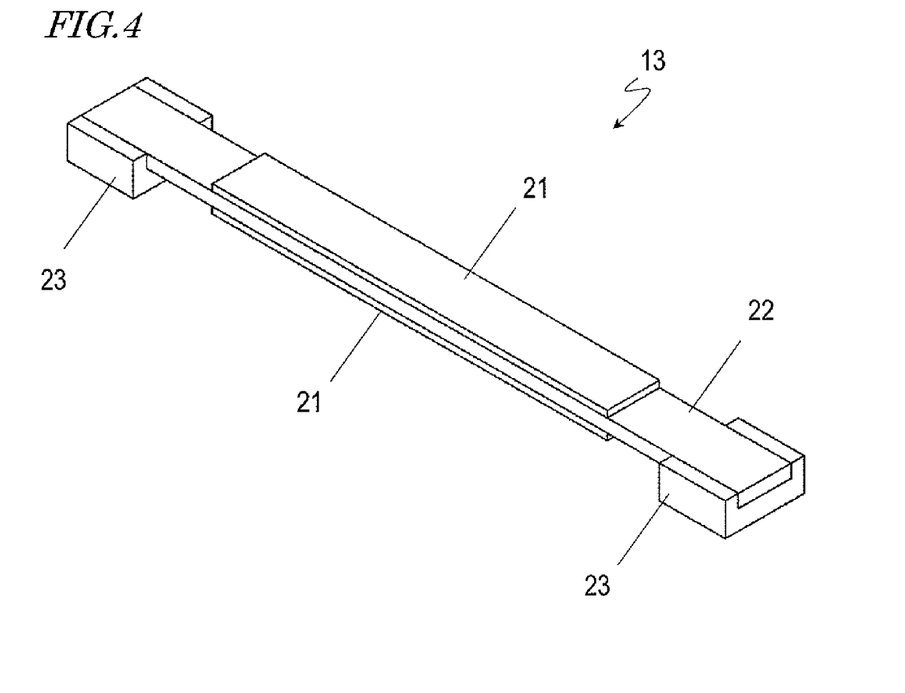
FIG. 4 is an external perspective view showing a vibrating section according to one embodiment.
Figure 5:
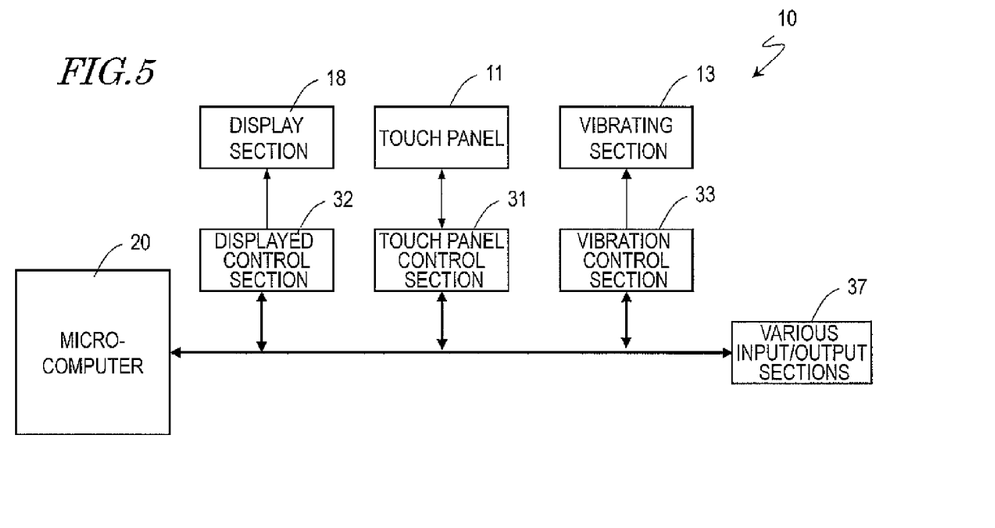
FIG. 5 is a block diagram showing a configuration of an electronic device according to one embodiment.

FIG. 1 is a perspective view showing the external appearance of the electronic device 10. FIG. 2 is an exploded parts view showing the electronic device 10. FIG. 3 is a cross-sectional view showing the electronic device 10. FIG. 4 is an external perspective view of a vibrating section 13. FIG. 5 is a block diagram showing a configuration of the electronic device 10.

As shown in FIGS. 1 and 2, the electronic device 10 includes an upper cover 14, a touch panel 11, the vibrating section 13, a spacer 17, a display section 18, a fixing bracket 16, a substrate 19, and a lower cover 15. The touch panel 11 is arranged so as to cover the display section 18. The vibrating section 13 vibrates the touch panel 11.

As shown in FIG. 3, vibrating sections 13a and 13b are attached, as the vibrating section 13, to the lower side of the touch panel 11. The display section 18 and the substrate 19 are held by the fixing bracket 16, and the fixing bracket 16 is attached to the lower cover 15. The touch panel 11 is attached to the fixing bracket 16 via the spacer 17 therebetween. The spacer 17 is a shock-absorbing member of a silicon rubber, a urethane rubber, or the like, for example. The upper cover 14 and the lower cover 15 are coupled together by screws or bonding.

As shown in FIG. 4, the vibrating section 13 includes piezoelectric elements 21, a shim plate 22 and bases 23. The piezoelectric elements 21 are attached to the front side and the rear side of the shim plate 22, and the opposite ends of the shim plate 22 are attached to the bases 23. The bases 23 are attached to the touch panel 11.

The piezoelectric element 21 is, for example, piezoelectric ceramic of lead zirconate titanate, or the like, or piezoelectric single crystal of lithium niobate, or the like. The piezoelectric elements 21 are stretched and shrunk by voltage application. A control can be performed such that one of the piezoelectric elements 21 attached on opposite sides of the shim plate 22 stretches while the other shrinks, thereby generating flexural vibrations on the shim plate 22. The vibration frequency is desirably about 100-400 Hz.

The shim plate 22 is a spring member of phosphor bronze, etc. The vibration of the shim plate 22 vibrates the touch panel 11 via the bases 23, and the user operating the touch panel 11 can feel the vibration of the touch panel 11. The bases 23 are a metal such as aluminum or brass, or a plastic such as PET or PP.

Note that while the piezoelectric elements 21 are attached to the shim plate 22 in the present embodiment, the piezoelectric elements 21 may be attached directly to the touch panel 11. Alternatively, the piezoelectric elements 21 may be attached directly to any of the members of the electronic device 10, e.g., the display section 18, the upper cover 14 and the lower cover 15. Alternatively, a thin-film transparent piezoelectric member may be formed on the touch panel 11 by a method such as sputtering, and used as the vibrating section 13. Where a cover member, or the like, is present on the touch panel 11, the piezoelectric elements 21 may be attached to the cover member. Note that where a cover member is present on the touch panel 11, the touch panel 11 and the cover member are collectively referred to as a panel member for detecting a touch position. A vibration motor may be used as the vibrating section 13.

As shown in FIG. 5, the electronic device 10 includes a display control section 32 for controlling the display of the display section 18, a touch panel control section 31 for controlling the touch panel 11, and a vibration control section 33 for controlling the vibration of the vibrating section 13. The electronic device 10 also includes a microcomputer 20 and various input/output sections 37 for performing various types of control.

<Description of Each Component>

The display section 18 displays characters, numbers, icons, keyboards, etc., used for accepting inputs from the user. When a keyboard is displayed on the display section 18, the user can make a character input, etc., by performing a touch operation at an arbitrary position on the keyboard. The display section 18 may be a known display device of, for example, a liquid crystal type, an organic EL type, an electronic paper type, a plasma type, etc.

The display control section 32 controls the content displayed on the display section 18 based on the control signal generated by the microcomputer 20.

The touch panel 11 can detect the touch position of the user. Information on the touch position of the user is sent to the microcomputer 20 via the touch panel control section 31. The touch panel 11 may be a touch panel of, for example, an electrostatic type, a resistive type, an optical type, an ultrasonic type, an electromagnetic type, etc.

While the touch panel 11 and the display panel 18 are separate components in this example, the touch panel 11 and the display panel 18 may be formed as an integral member. For example, an in-cell type touch panel may be employed where the touch panel function is integrated inside a liquid crystal panel, or an on-cell type touch panel may be employed where the touch panel function is integrated on the surface of a liquid crystal panel.

The vibrating section 13 vibrates the touch panel 11. The vibration control section 33 controls the vibration pattern of the vibrating section 13.

Figure 6:
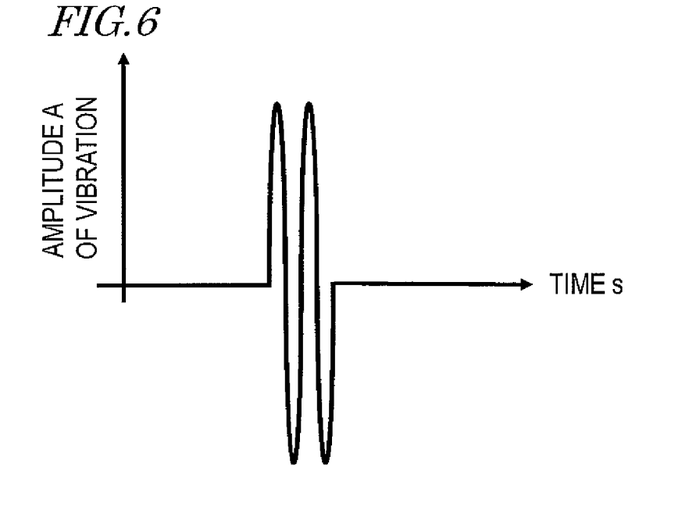
FIG. 6 is a diagram showing an example of a vibration pattern of a vibrating section according to one embodiment.

FIG. 6 is a diagram showing an example of a vibration pattern. In response to an instruction from the microcomputer 20, the vibration control section 33 applies a voltage having a waveform shown in FIG. 6 to the vibrating section 13 to vibrate the touch panel 11, thereby giving the user vibration A1. The voltage for generating vibration A1 is a sinusoidal wave of 150 Hz, 33 Vrms and 2 cycles. Then, the amplitude on the touch panel 11 is about 5 µm. Note that by setting the frequency and the voltage so that the vibration amplitude on the touch panel 11 is about 5-50 µm, it is possible to present a tactile sensation (vibration) that feels comfortable on a finger of a person.

Next, a touch operation example will be described. With the electronic device 10 according to one embodiment, if the microcomputer 20 detects that after the user touches the touch panel 11 with multiple fingers, the user lifts at least one of the fingers off the touch panel 11 with at least one other of the multiple fingers remaining on the touch panel 11, the vibration control section 33 changes the vibration of the vibrating section 13. The display section 18 also changes what is displayed thereon in response to the user's operation of lifting at least one finger off the touch panel 11. It is possible to give the user a realistic control feel by changing the vibration of the touch panel 11 in response to a complicated operation, such as an operation using multiple fingers. The method of changing the vibration of the touch panel 11 may be to transition between a state where there is no vibration and another state where there is a vibration, or to transition from a certain vibration to another vibration. For example, from a certain vibration, the amplitude and/or the frequency may be changed, or the cycle with which vibrations are generated may be changed.

<Touch Operation Example 1>

Figure 7:
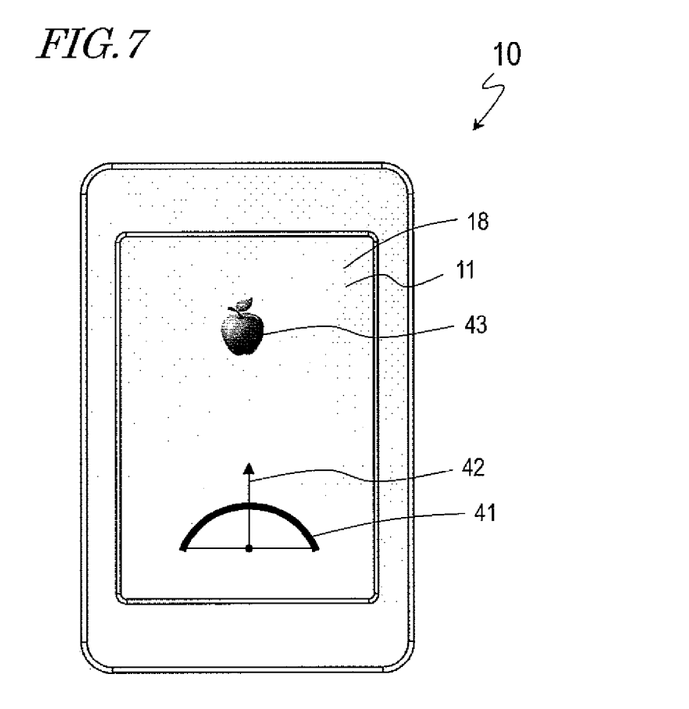
FIG. 7 is a diagram showing a display screen for a touch operation example according to one embodiment.

FIG. 7 shows the display screen in touch operation example 1. The display section 18 of the electronic device 10 is displaying a game screen in which an arrow 42 is shot from a bow 41 to hit an apple 43.

Figure 8A:
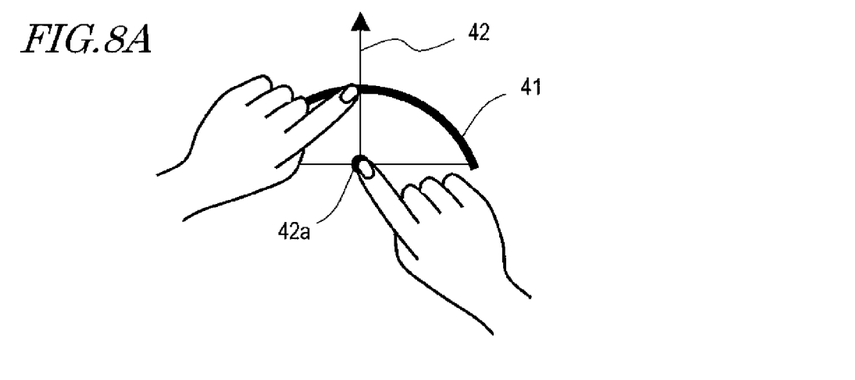
FIG. 8A is a diagram showing a state of operation for a touch operation example according to one embodiment.
Figure 8B:
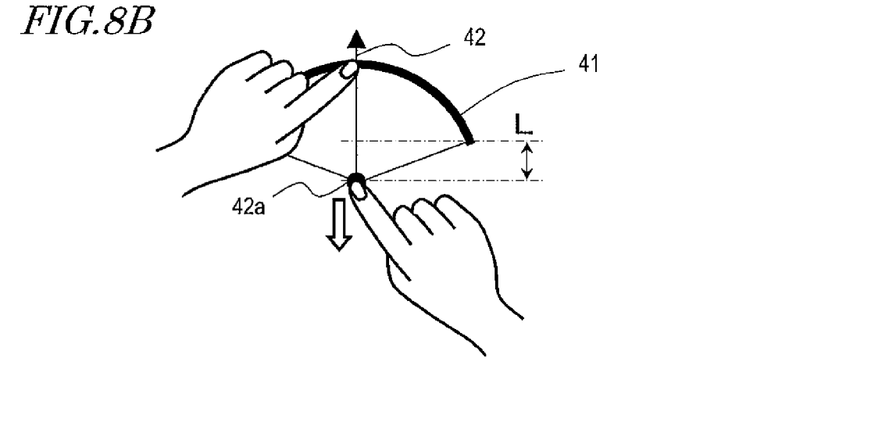
FIG. 8B is a diagram showing a state of operation for a touch operation example according to one embodiment.
Figure 8C:
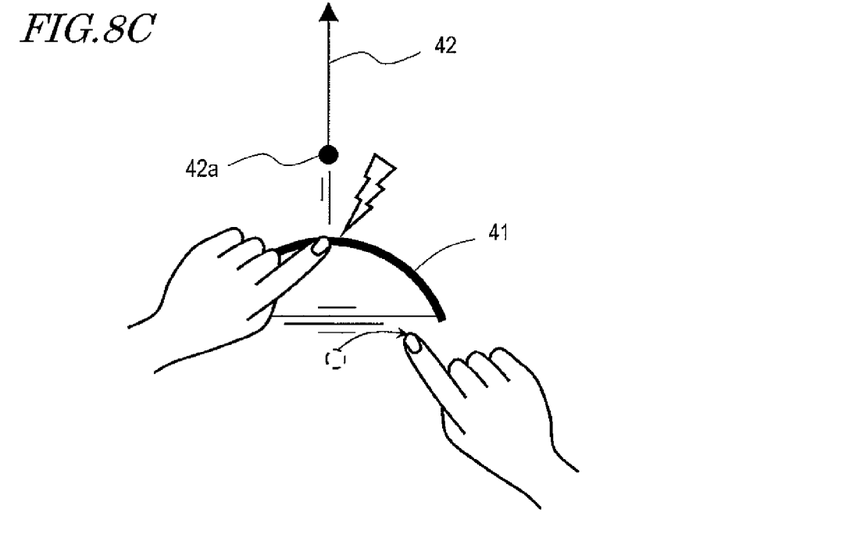
FIG. 8C is a diagram showing a state of operation for a touch operation example according to one embodiment.

FIGS. 8A to 8C are diagrams each showing a state of operation in touch operation example 1. Referring to FIG. 8A, the user touches the bow 41 and a tail portion 42a of the arrow 42 with fingers. Referring to FIG. 8B, a finger is slid downward while touching the tail portion 42a of the arrow 42. The amount of finger movement is denoted as L. The amount of movement L is also the amount of change in the interval between the finger of the left hand touching the bow 41 and the finger of the right hand touching the tail portion 42a of the arrow 42. Referring to FIG. 8C, when the finger on the tail portion 42a of the arrow 42 is lifted off the touch panel 11, the arrow 42 is shot, and the vibrating section 13 is vibrated, thereby giving a tactile sensation to the other finger touching the bow 41.

Thus, the touch panel 11 is operated with multiple fingers, and the touch panel 11 is vibrated when at least one finger is lifted off the touch panel 11. By varying the vibration of the touch panel 11 based on how multiple fingers were moved before lifting one finger off, the user can feel the input status upon lifting one finger off through a tactile sensation, thus realizing a realistic control feel.

Figure 9A:
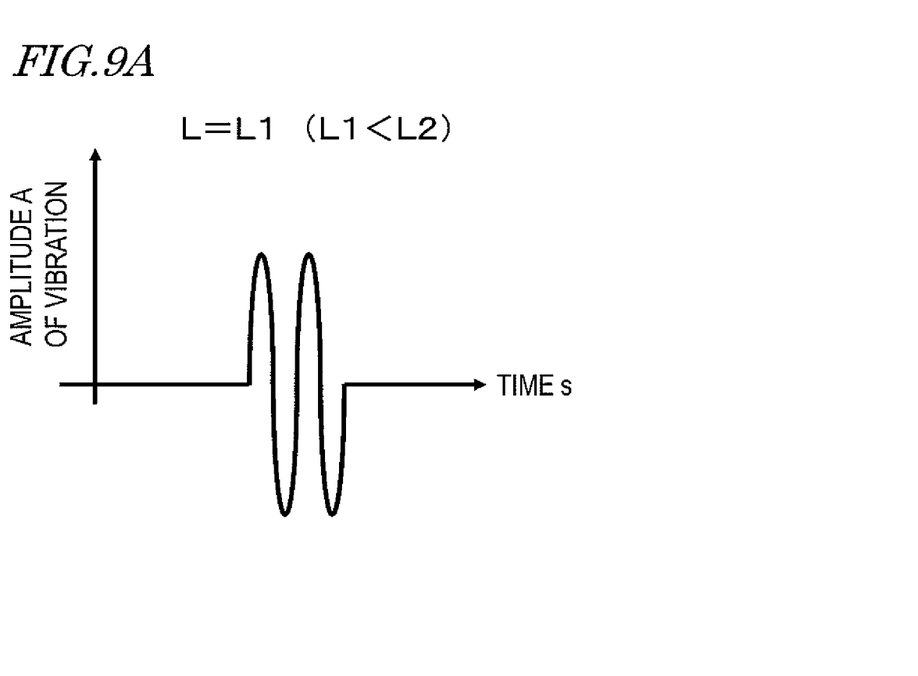
FIG. 9A is a diagram showing an example of a vibration pattern of a vibrating section for a touch operation example according to one embodiment.
Figure 9B:
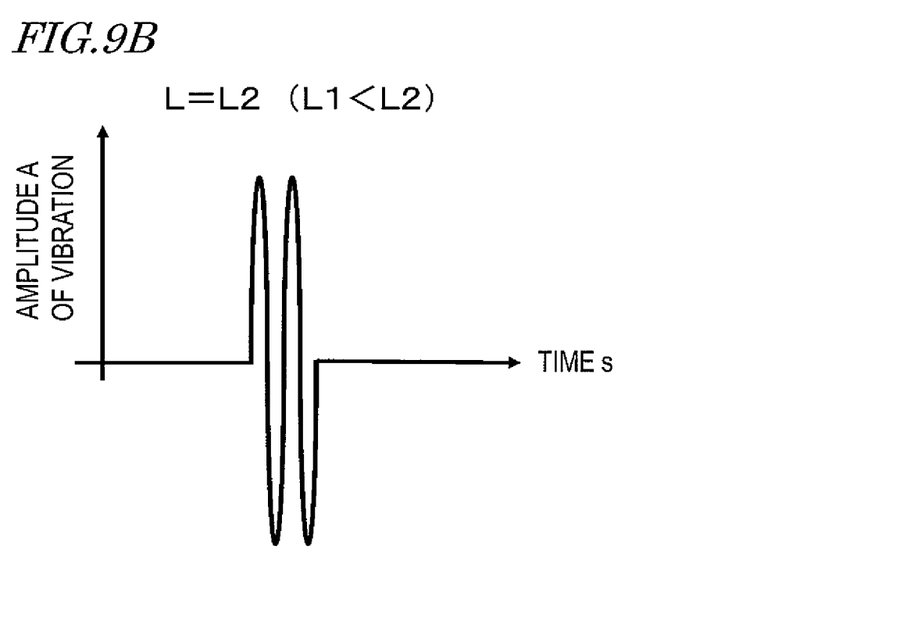
FIG. 9B is a diagram showing an example of a vibration pattern of a vibrating section for a touch operation example according to one embodiment.

FIGS. 9A and 9B are diagrams each showing an example of a vibration pattern in touch operation example 1. The vibration control section 33 controls the vibration of the vibrating section 13 based on the amount of finger movement L. FIG. 9A shows a vibration pattern when the amount of finger movement is L1. The vibrating section 13 generates a two-pulse vibration. FIG. 9B shows a vibration pattern when the amount of finger movement is L2. The amount of finger movement L2 is greater than L1, i.e., L1<L2. As shown in FIG. 9B, a vibration of a greater amplitude is generated as compared with when the amount of finger movement is L1. As the arrow 42 is shot with a greater velocity and with a louder sound as the amount of finger movement L increases, the user can obtain an even more realistic control feel.

<Touch Operation Example 2>

Figure 10A:
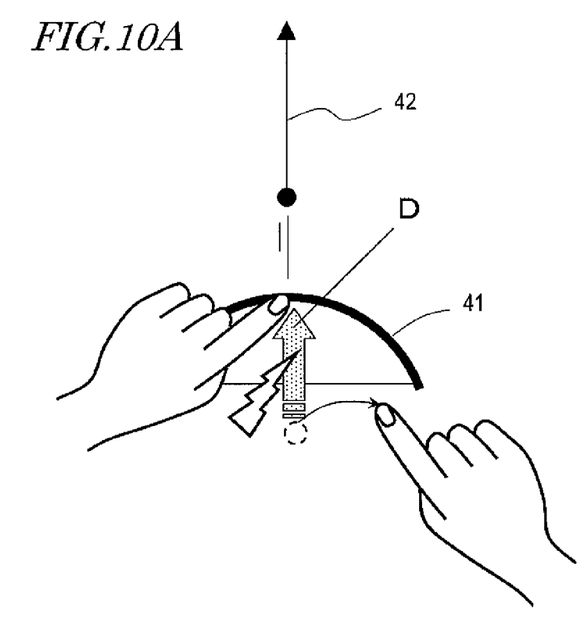
FIG. 10A is a diagram showing a state of operation for a touch operation example according to one embodiment.
Figure 10B:
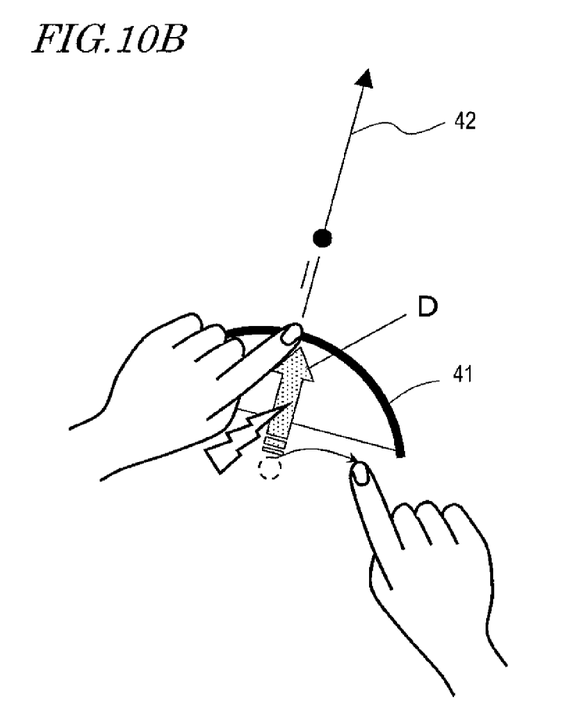
FIG. 10B is a diagram showing a state of operation for a touch operation example according to one embodiment.
Figure 10C:
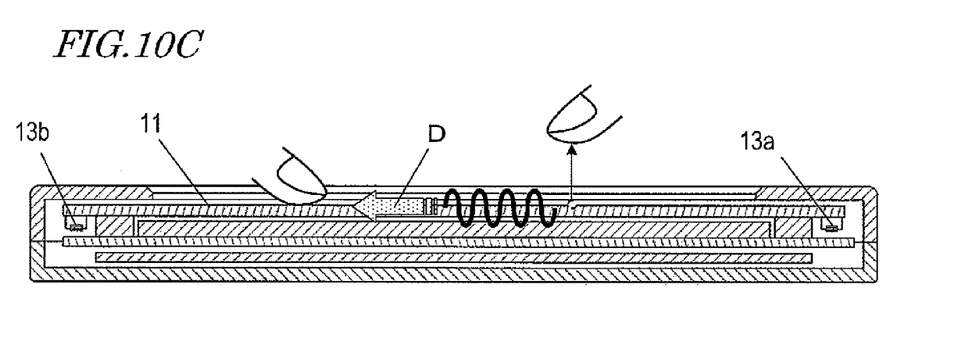
FIG. 10C is a diagram showing a state of operation for a touch operation example according to one embodiment.

Touch operation example 2 will now be described using the game operation described above with reference to FIGS. 7 to 8C. FIGS. 10A to 10C each show a state of operation in touch operation example 2. FIGS. 10A and 10B show a state where one finger has been lifted off the touch panel 11 after pulling the string of the bow 41. FIG. 10C is a cross-sectional view showing the electronic device 10. FIG. 10B shows a state where the user has changed the direction in which the string is pulled so as to change the direction in which the arrow 42 will fly. Then, a vibration is generated that propagates in the direction from the position at which one finger has been lifted off the touch panel 11 to the position of the other finger remaining on the bow 41, i.e., the direction of the arrow D. Based on the results obtained by the touch panel 11 detecting the positions of the two fingers, the microcomputer 20 calculates the direction of propagation of the vibration, and sends an instruction to the vibration control section 33. The vibration control section 33 generates a vibration propagating in the direction of the arrow D by controlling the phase, the amplitude and the frequency of vibrations of the vibrating sections 13a and 13b. For example, it is possible to move the position of vibration in the direction of the arrow D by varying the positions of the node and the antinode of the vibration on the touch panel 11. By generating such a vibration, the finger holding the bow 41 will feel a tactile sensation moving in the direction in which the arrow 42 flies, thereby realizing a realistic control feel.

<Touch Operation Example 3>

Figure 11:
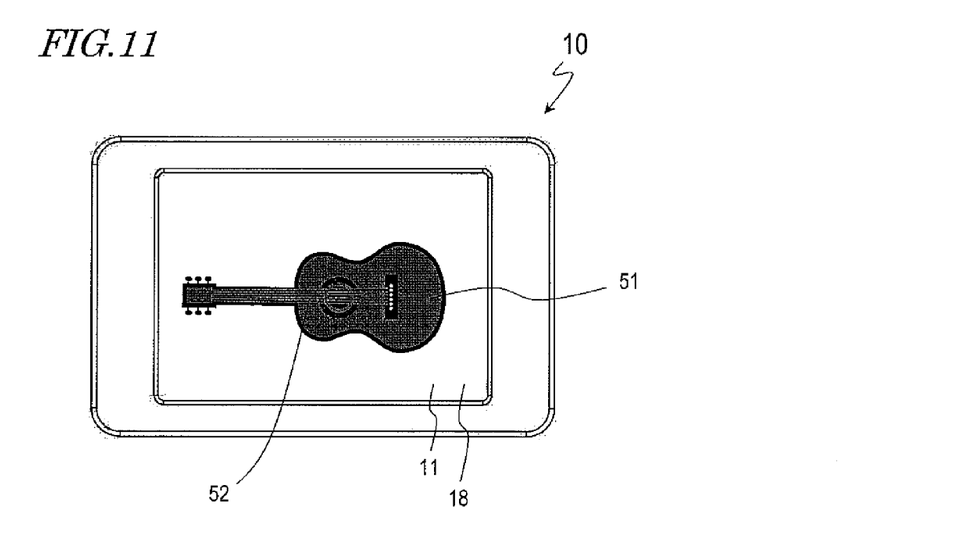
FIG. 11 is a diagram showing a display screen for a touch operation example according to one embodiment.
Figure 12A:
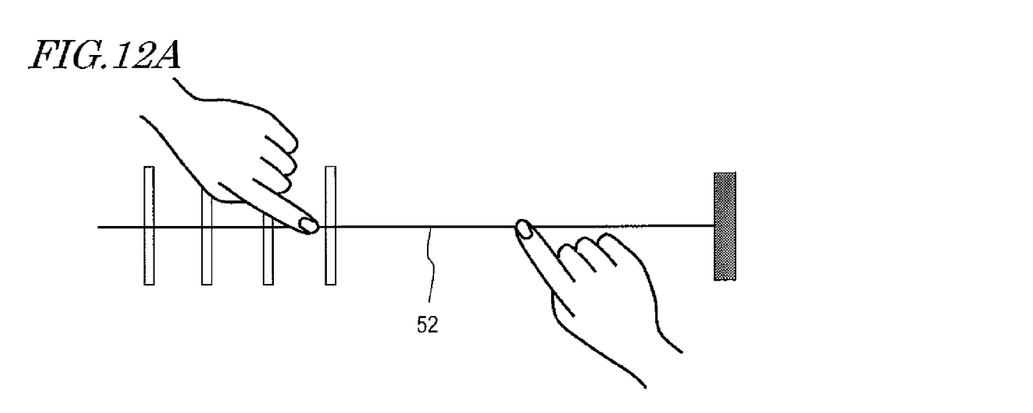
FIG. 12A is a diagram showing a state of operation for a touch operation example according to one embodiment.
Figure 12B:
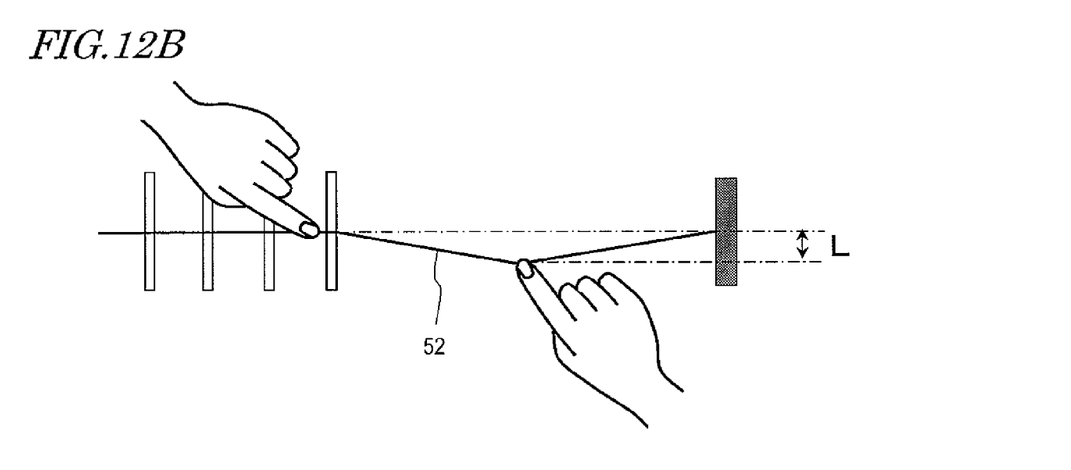
FIG. 12B is a diagram showing a state of operation for a touch operation example according to one embodiment.
Figure 12C:
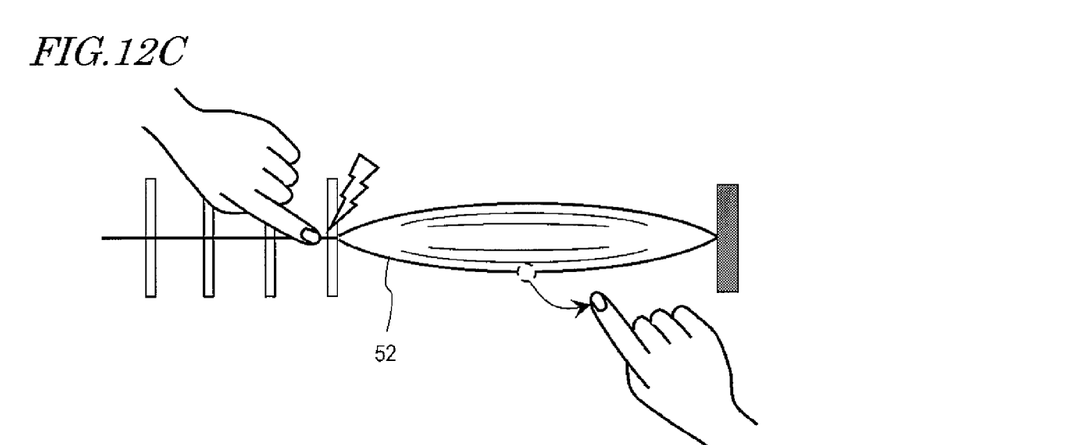
FIG. 12C is a diagram showing a state of operation for a touch operation example according to one embodiment.

FIG. 11 shows the display screen in touch operation example 3. The display section 18 displays a guitar 51 that can be played by picking a string 52. FIGS. 12A to 12C are diagrams each showing a state of operation in touch operation example 3. Referring to FIG. 12A, two positions along the string 52 are touched by fingers. Referring to FIG. 12B, the finger of the right hand touching around the center of the string 52 is slid downward. The amount of finger movement is denoted as L. As the amount of movement L changes, the interval between the fingers touching the string 52 also changes. Referring to FIG. 12C, when the finger on the center of the string 52 is lifted off the touch panel 11, the sound of the string 52 is played, and the vibrating section is vibrated, thereby giving a tactile sensation to the finger of the left hand remaining on the string 52.

Figure 13A:
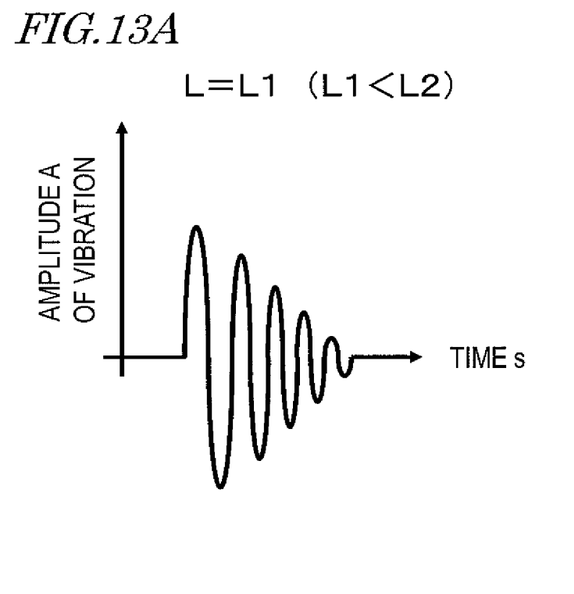
FIG. 13A is a diagram showing an example of a vibration pattern of a vibrating section for a touch operation example according to one embodiment.
Figure 13B:
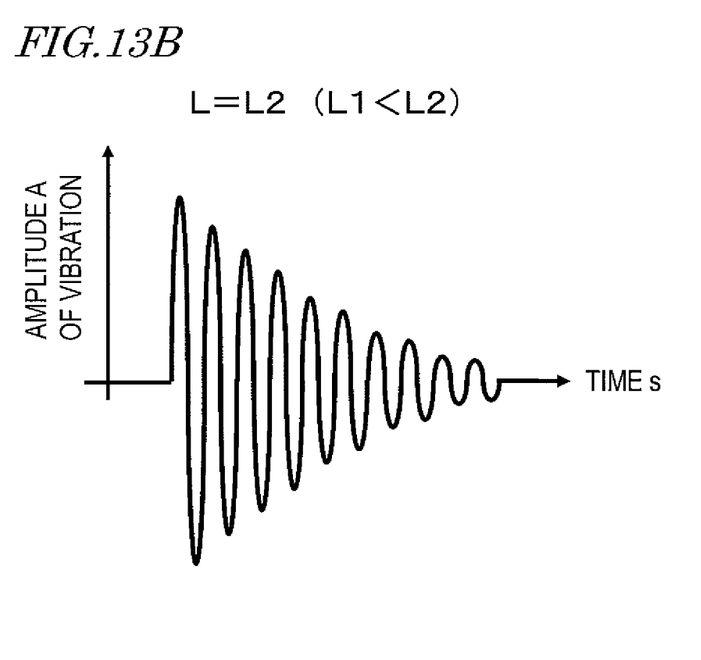
FIG. 13B is a diagram showing an example of a vibration pattern of a vibrating section for a touch operation example according to one embodiment.

FIGS. 13A and 13B are diagrams each showing an example of a vibration pattern in touch operation example 3. The vibration control section 33 controls the vibration of the vibrating section 13 based on the amount of finger movement L. FIG. 13A shows a vibration pattern when the amount of finger movement is L1. The vibrating section 13 generates a vibration that attenuates gradually. FIG. 13B shows a vibration pattern when the amount of finger movement is L2. The amount of finger movement L2 is greater than L1, i.e., L1<L2. In FIG. 13B, the vibration of the vibrating section 13 is a vibration that decreases gradually, but the initial amplitude thereof is larger than that of FIG. 13A and it takes a longer time before it attenuates substantially. That is, as the string 52 is picked more strongly, a larger sound is reproduced while the vibrating section 13 generates a vibration having a larger amplitude and lasting for a longer time. As the user feels the vibration of the string 52 on the display section 18 and a touch panel vibration that is generated in synchronism with the sound of the string 52, the user can obtain a more realistic control feel.

Note that when all fingers are lifted off the touch panel 11 after a finger of the right hand touching around the center of the string 52 is slid downward, a different vibration may be generated from the vibration which is generated when a finger still remaining on the touch panel 11. When all fingers are lifted off, no vibration may be generated or a vibration may be stopped. The vibration may be varied depending on the number and/or the positions of fingers remaining on the touch panel 11 after a certain finger is lifted off. Thus, it is possible to realize a more realistic control feel in response to an operation using multiple fingers.

<Touch Operation Example 4>

Figure 14A:
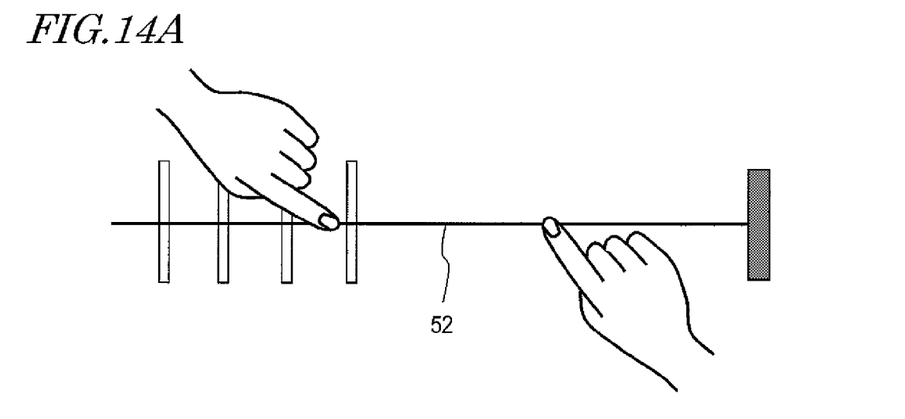
FIG. 14A is a diagram showing a state of operation for a touch operation example according to one embodiment.
Figure 14B:
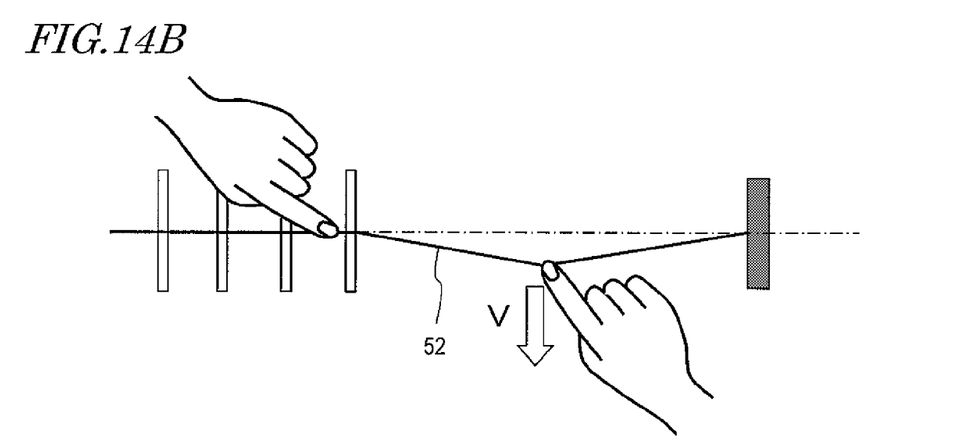
FIG. 14B is a diagram showing a state of operation for a touch operation example according to one embodiment.
Figure 14C:
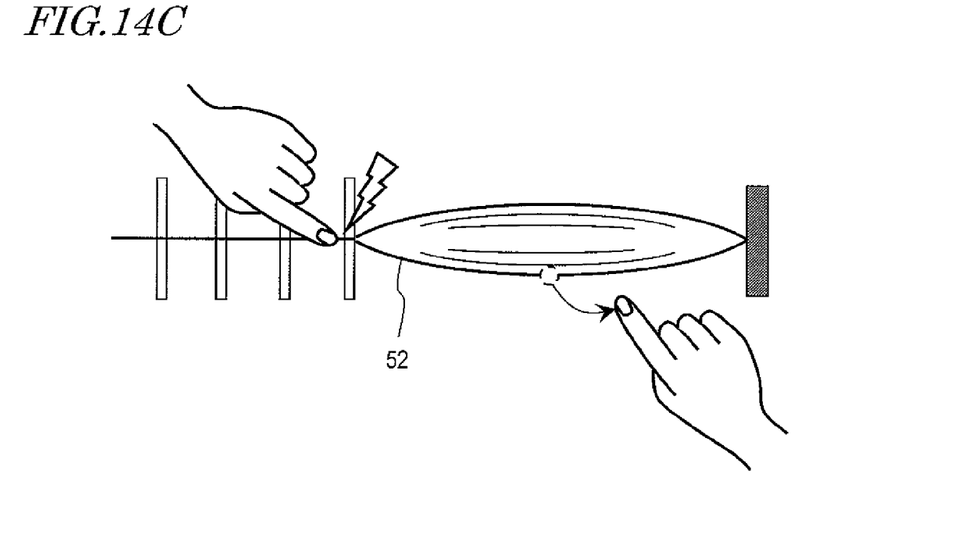
FIG. 14C is a diagram showing a state of operation for a touch operation example according to one embodiment.

Touch operation example 4 will be described, using a touch operation of playing the guitar 51 shown in FIG. 11. FIGS. 14A to 14C show diagrams each showing a state of operation in touch operation example 4. Referring to FIG. 14A, two positions along the string 52 are touched by fingers. Referring to FIG. 14B, the finger of the right hand touching the center of the string 52 is slid downward. The moving velocity (the amount of movement per unit time) of the finger is denoted as V. The amount of change per unit time of the interval between the fingers touching the string 52 also varies based on the change of the moving velocity V. Referring to FIG. 14C, when the finger touching the center of the string 52 is lifted off the touch panel 11, the sound of the string 52 is reproduced and the vibrating section 13 is vibrated, thereby giving a tactile sensation to the finger holding the string 52.

Figure 15A:
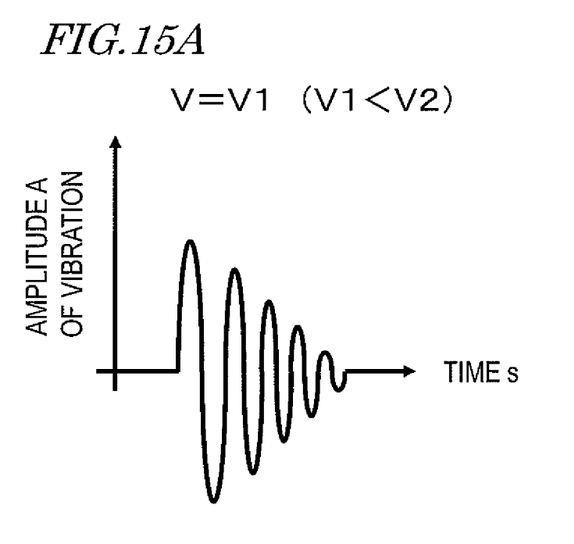
FIG. 15A is a diagram showing an example of a vibration pattern of a vibrating section for a touch operation example according to one embodiment.
Figure 15B:
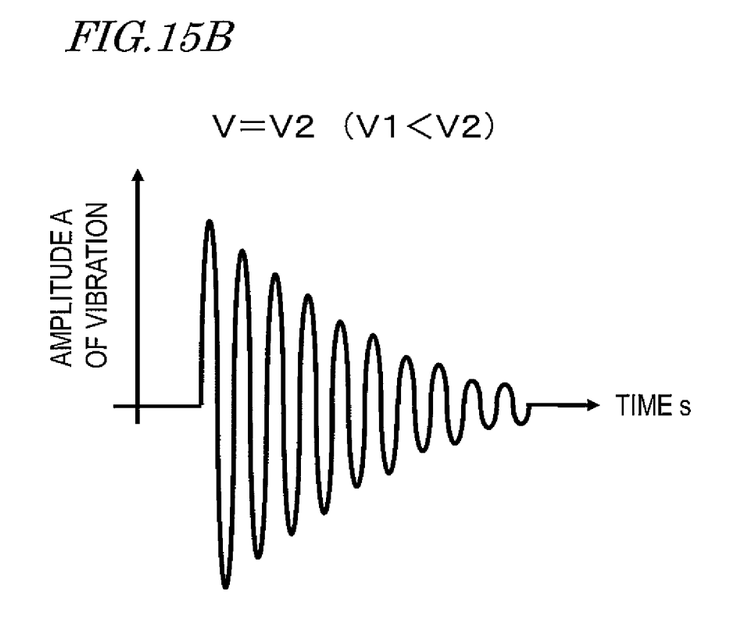
FIG. 15B is a diagram showing an example of a vibration pattern of a vibrating section for a touch operation example according to one embodiment.

FIGS. 15A and 15B are diagrams each showing an example of a vibration pattern in touch operation example 3. The vibration control section 33 controls the vibration of the vibrating section 13 based on the moving velocity V of the finger. FIG. 15A shows a vibration pattern when the moving velocity is V1. The vibrating section 13 generates a vibration that attenuates gradually. FIG. 15B shows a vibration pattern when the moving velocity is V2. The moving velocity V2 of the finger is greater than V1, i.e., V1<V2. In FIG. 15B, the vibration of the vibrating section 13 is a vibration that decreases gradually, but the initial amplitude thereof is larger than that of FIG. 15A and it takes a longer time before it attenuates substantially. That is, as the string 52 is picked more strongly, a larger sound is reproduced while the vibrating section 13 generates a vibration having a larger amplitude and lasting for a longer time. As the user feels the vibration of the string 52 on the display section 18 and a touch panel vibration that is generated in synchronism with the sound of the string 52, the user can obtain a more realistic control feel.

(Other Embodiments)

As described above, one embodiment has been described above as an example of the technique disclosed in the present application. However, the technique of this disclosure is not limited thereto, but is also applicable to other embodiments in which changes, replacements, additions, omissions, etc., are made as necessary. Different ones of the elements described in the embodiment described above may be combined together to obtain a new embodiment.

Other embodiments will be illustrated hereinbelow.

While a control section is provided for each component for controlling the component in the embodiment above, the present disclosure is not limited thereto. Any of various control sections, such as the vibration control section 33, may be implemented by the microcomputer 20.

While the embodiment above is directed to a tablet-type electronic device as an example of the electronic device 10, the electronic device 10 is not limited thereto. For example, the electronic device may be any electronic device including the touch panel 11, such as a mobile telephone, a PDA, a game device, a car navigation, an ATM, etc.

While the touch panel 11 covers the entire display surface of the display section 18 in the embodiment above, the present disclosure is not limited thereto. For example, the touch panel function may be provided only in a central portion of the display surface while the peripheral portion is not covered by a member having the touch panel function.

The frequency, the voltage and the number of cycles of the vibration pattern illustrated in the embodiment above are merely illustrative, and it may be a different waveform such as a square wave or saw-tooth wave, an intermittent waveform, or a waveform whose frequency or amplitude changes continuously.

While the touch panel 11 provided on the display surface side of the display section 18 has been described as an example of the panel to be touched by the user, the panel is not limited thereto. For example, it may be a pointing device such as a touch pad. In such a case, the vibrating section 13 is provided in the touch pad, and the touch pad is vibrated in response to an operation using multiple fingers.

While a tactile sensation is presented by generating vibrations in the embodiments above, the technique of the present disclosure is not limited thereto. Other than vibration, tactile sensations may be presented in other forms, e.g., as a variation of friction using static electricity, a skin stimulation using electric current, and a variation of screen shape using liquid.

In addition to presenting a tactile sensation, screen display, sound, light, heat, etc., may be used in combination as necessary.

Note that the operation of the electronic device described above may be implemented by means of hardware or software. A computer program implementing such a control operation is stored, for example, in an internal memory of the microcomputer 20. Such a computer program may be installed onto the electronic device from a storage medium (an optical disc, a semiconductor memory, etc.) storing the computer program, or may be downloaded via a telecommunications network such as the Internet.

(Summary)

The electronic device 10 according to one embodiment includes: the touch panel 11 to be touched by the user; the vibrating section 13 for vibrating the touch panel 11; and the vibration control section 33 for controlling the vibration of the vibrating section 13. The vibration control section 33 changes the vibration of the vibrating section 13 when, after the user touches the touch panel 11 with multiple fingers, the user lifts at least one of the multiple fingers off the touch panel 11 with at least one other of the multiple fingers remaining on the touch panel 11. Thus, it is possible to present, to the user, a realistic control feel in response to a complicated operation, such as an operation using multiple fingers.

With the electronic device 10 according to one embodiment, for example, when, after the user touches the touch panel 11 with multiple fingers, the user lifts at least one of the multiple fingers off the touch panel 11 with at least one other of the multiple fingers remaining on the touch panel 11, the vibration control section 33 generates a vibration in the vibrating section 13. Thus, it is possible to present, to the user, a realistic control feel in response to a complicated operation, such as an operation using multiple fingers.

With the electronic device 10 according to one embodiment, for example, the vibration control section 33 changes the vibration of the vibrating section 13 when, after the user touches the touch panel 11 with multiple fingers, the user changes the interval between fingers and lifts at least one of the multiple fingers off the touch panel 11 with at least one other of the multiple fingers remaining on the touch panel 11. Thus, it is possible to present, to the user, a realistic control feel in response to a complicated operation, such as an operation using multiple fingers. The vibration control section 33 changes the vibration based on the amount of change in the interval between fingers, for example. For example, the strength of the vibration generated by the vibration control section 33 in the vibrating section 13 when one of the multiple fingers is lifted off the touch panel 11 is greater when the amount of change in the interval between fingers is larger than when it is smaller. Alternatively, for example, the vibration control section 33 changes the vibration based on the amount of change in the interval between fingers per unit time. Alternatively, for example, the strength of the vibration generated by the vibration control section 33 in the vibrating section 13 when at least one of the multiple fingers is lifted off the touch panel 11 is greater when the amount of change in the interval between fingers per unit time is larger than when it is smaller. Thus, it is possible to present, to the user, a realistic control feel in response to a complicated operation, such as an operation using multiple fingers.

With the electronic device 10 according to one embodiment, for example, the vibration control section 33 changes the position at which a vibration is generated on the touch panel 11 based on the direction in which the interval between fingers has been changed. Alternatively, for example, the vibration control section 33 moves the position on the touch panel 11 at which a vibration is generated along a direction from the position on the touch panel 11 at which a finger has been lifted off toward the contact position of the finger that is remaining on the touch panel 11. Thus, it is possible to present, to the user, a realistic control feel in response to a complicated operation, such as an operation using multiple fingers.

The electronic device 10 according to one embodiment may further include the display section 18 for displaying information. In response to an operation in which the user lifts at least one finger off the touch panel 11, the display section 18 changes the content displayed thereon, and the vibration control section 33 changes the vibration of the vibrating section 13. Thus, it is possible to present, to the user, a realistic control feel in response to a complicated operation, such as an operation using multiple fingers.

A computer program according to one embodiment instructs the electronic device 10 to perform vibration operations. The computer program instructs the microcomputer 20 of the electronic device 10 to perform the steps of: detecting a touch operation performed by the user on the touch panel 11; and changing a vibration of the panel when, after the user touches the touch panel 11 with multiple fingers, the user lifts at least one of the multiple fingers off the touch panel 11 with at least one other of the multiple fingers remaining on the touch panel 11. Thus, it is possible to present, to the user, a realistic control feel in response to a complicated operation, such as an operation using multiple fingers.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in, the detailed description.

The embodiments above are for illustrating the technique disclosed herein, and various changes, replacements, additions, omissions, etc., can be made without departing from the scope defined by the claims and equivalents thereto.

The present disclosure is applicable to an electronic device on which a user can perform a touch operation, for example.

This application is based on Japanese Patent Applications No. 2012-011888 filed on Jan. 24, 2012 and No. 2012-268924 filed on Dec. 10, 2012, the entire contents of which are hereby incorporated by reference.

What is claimed is:

1. An electronic device comprising:
    a panel to be touched by a user;
    a vibrating section for vibrating the panel; and
    a vibration control section for controlling the vibration of the vibrating section,
    wherein the vibration control section changes the vibration of the vibrating section when, after the user touches the panel with multiple fingers, the user changes an interval between fingers and lifts at least one of the multiple fingers off the panel with at least one other of the multiple fingers remaining on the panel;
    wherein the vibration control section changes the vibration based on an amount of change in the interval between fingers; and
    wherein a strength of the vibration generated in the vibrating section by the vibration control section when the user lifts at least one of the multiple fingers off the panel is greater when the amount of change in the interval between fingers is larger than when the amount of change in the interval between fingers is smaller.

2. The electronic device of claim 1, wherein the vibration control section vibrates the vibrating section when, after the user touches the panel with the multiple fingers, the user lifts at least one of the multiple fingers off the panel with at least one other of the multiple fingers remaining on the panel.

3. The electronic device of claim 1, wherein the vibration control section changes a position on the panel at which a vibration is generated based on a direction in which the interval between fingers has been changed.

4. The electronic device of claim 1, wherein the vibration control section moves a position on the panel at which the vibration is generated along a direction from a position on the panel at which a finger has been lifted off toward a contact position of a finger that is remaining on the panel.

5. The electronic device of claim 1, further comprising a display section for displaying information,
    wherein in response to an operation in which the user lifts at least one finger off the panel, the display section changes content displayed thereon and the vibration control section changes the vibration of the vibrating section.

6. An electronic device comprising:
    a panel to be touched by a user;
    a vibrating section for vibrating the panel; and
    a vibration control section for controlling the vibration of the vibrating section,
    wherein the vibration control section changes the vibration of the vibrating section when, after the user touches the panel with multiple fingers, the user changes an interval between fingers and lifts at least one of the multiple fingers off the panel with at least one other of the multiple fingers remaining on the panel;
    wherein the vibration control section changes the vibration based on an amount of change in the interval between fingers per unit time; and
    wherein a strength of the vibration generated in the vibrating section by the vibration control section when the user lifts at least one of the multiple fingers off the panel is greater when the amount of change in the interval between fingers per unit time is larger than when the amount of change in the interval between fingers per unit time is smaller.

7. A non-transitory computer readable medium storing a computer program for instructing an electronic device to perform vibration operations, the computer program instructing a computer of the electronic device to perform the steps of:
    detecting a touch operation by a user on a panel; and
    changing a vibration on the panel when, after the user touches the panel with the multiple fingers, the user changes an interval between fingers and lifts at least one of the multiple fingers off the panel with at least one other of the multiple fingers remaining on the panel;
    wherein the vibration is changed based on an amount of change in the interval between fingers; and
    wherein a strength of the vibration when the user lifts at least one of the multiple fingers off the panel is greater when the amount of change in the interval between fingers is larger than when the amount of changes in the interval between fingers is smaller.

* * * * *